June 12, 1923.
J. H. BRENNER
PISTON RING
Filed June 26, 1920
1,458,207
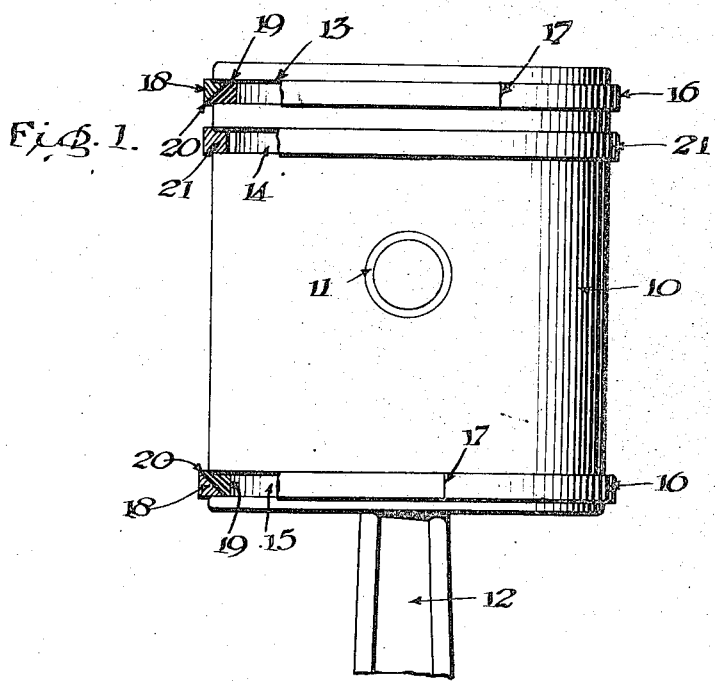
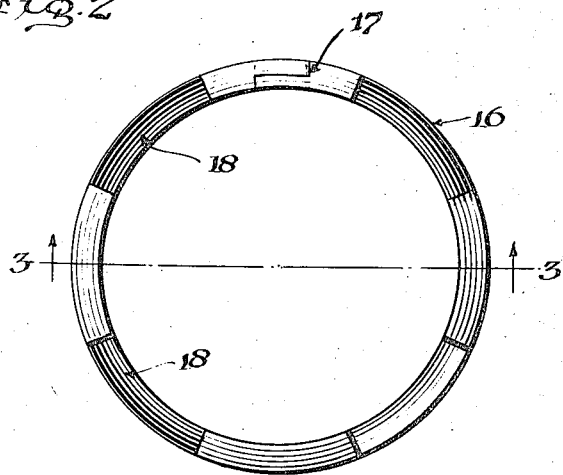
WITNESSES
INVENTOR
J. H. Brenner,
BY
ATTORNEYS Patented June 12, 1923.

1,458,207

UNITED STATES PATENT OFFICE.

JOHN HERBERT BRENNER, OF DOUGLAS, WYOMING.

PISTON RING.

Application filed June 26, 1920. Serial No. 391,877.

*To all whom it may concern:*

Be it known that I, JOHN HERBERT BRENNER, a citizen of the United States, and a resident of Douglas, in the county of Converse and State of Wyoming, have invented certain new and useful Improvements in Piston Rings, of which the following is a specification.

This invention relates to an improved piston ring particularly adapted to be employed in connection with piston rings on gasoline or internal combustion engines, in conjunction with a novel arrangement of rings for a piston of the reciprocating type, so constructed and arranged as to afford a leak-proof fit with the bore of the cylinder, the same being primarily intended as an oil ring but adapted for use as a compression ring with efficiency.

A further object of the invention is to provide an improved piston ring which is adapted to expand and contract by the pressure formed between the ring and the piston by the leakage of oil, air or other fluid or gaseous mixture within the cylinder so as to give a proper joint against leakage in both directions of movement and at the same time provide a ring which can be very easily produced and applied and removed in the ordinary way.

Other and further objects of my invention will become readily apparent to persons skilled in the art, from a consideration of the following description, when taken in conjunction with the accompanying drawings, wherein:—

Figure 1 is a side elevation of a piston having a piston ring and arrangement in accordance with the present invention, applied thereto, the rings being shown partly broken away and in section at one side, Figure 2 is a face view of one of the rings and Figure 3 is a diametrical sectional view taken on the line 3—3 of Figure 2.

Referring to the drawings in detail, in which like reference characters designate corresponding parts throughout the several views, there is shown a piston 10 having the usual wrist pin 11 to which the connecting rod 12 is pivotally joined for operation from the crank shaft in the usual manner. The piston is provided with a pair of grooves 13 and 14 spaced from the upper end thereof and for convenience, these grooves will be referred to as the first and second grooves. At the bottom or lower end, there is provided a third groove 15, said grooves extending entirely around the piston periphery in the usual way.

Disposed in the upper and lower, that is, the first and third grooves 13 and 15, are rings constructed in accordance with the present invention. The ring is designated at 16 and is of the split expansion type having the extremities thereof disposed with a step-cut 17, the ends being reduced in width to movably overlap and allow the necessary expansion and contraction as usual. One side face of the ring is provided with a series of equi-distantly spaced cuts or grooves 18 which extend diagonally, being cut from one corner to the other, so as to provide spaces 19 between the beveled faces 18 and the peripheral wall of the groove, said spaces communicating with the exterior surface of the piston and affording a communicating passage, as clearly shown in Figure 1 of the drawings. The joint 17 is preferably disposed at one of the spaced projecting portions which is not interrupted by the groove or slot 18 and which provide sharp edge portions 20 designed to sweep any oil or guide any fluid which may be compressed in front of the same into the spaces or chambers 19.

It will thus appear that the cutting of the ring, which latter is of the one-piece concentric type having the joint as described, at the inside, and especially, at an angle of 45° running to a thin edge at the outer circumference of the ring, that alternate slots and solid portions will be provided depending upon the size of the ring and width thereof, an equal portion being slotted with respect to that portion which is unslotted, or left solid. As so constructed, the ring is primarily intended as an oil ring, and when so employed the rings are arranged in the grooves 13 and 15 at opposite ends of the piston so as to act in opposite directions, the ring in the groove 13 expanding on the working stroke of the piston and contracting on the compression strokes, while also expanding on the suction stroke at the time that the gaseous mixture is being let or drawn into the cylinder. The ring in the groove 15 at the lower end of the piston is disposed in a reverse position and acts in a reverse direction, the expansion of the oil or fluid beneath the walls 18 of the cut-out portions tending to force the ring outward so as to form an efficient seal between the peripheral surface thereof and the interior wall of the cylinder, the oil forming a seal as it is thought will be understood. On the reverse action, there is a tendency to produce a vacuum in said spaces which permits or causes the ring to contract, thus permitting free movement or avoiding undue friction except at that end which it is desired to seal, depending upon the direction of motion of the piston. When employed in connection with the ring 21 of ordinary form or rectangular cross section disposed within the groove 14, that is, the second groove, the action is the same, except that the ring 21 forms an additional seal while the especially designed ring will be expanded and contracted as described, the expansion being caused by the pressure formed between the ring and the piston due to the leakage into the slots or spaces formed thereby with the piston. Thus, the ring acts on the vacuum principle, the action thereof reversing on the reversing of the direction of movement of the piston and the first ring having the slots opening toward the crank case or in a direction opposing the direction of movement when on the compression and exhaust strokes, while the second ring is a plain step-cut ring and the third ring is disposed with the slots toward the head of the cylinder or in the direction of the compression stroke. When the ring is used as an oil ring only, it is placed in the first ring groove with the slots opening opposite the compression end of the cylinder, and other types of rings are used for compression rings, the upper or oil retaining ring being held to the upper seat in its ring groove until the vacuum above the piston has reduced to atmospheric pressure and compression is begun. Of course, it is to be understood that the manner of cutting the grooves or recesses may be slightly varied and other shapes and types of openings in the edge of the ring may be employed so long as the ring is made to expand by means of internal pressure or variations in the pressure between the ring and the piston at the walls of the grooves therein, and the opposite ends of the cylinder, so as to act under compression or a vacuum to cause the expansion and contraction thereof, as explained. Of course, the rings will move against the opposite sides of the grooves or seats formed thereby, and oil will be forced into the spaces to facilitate the formation of a seal in the expansion of the ring and to receive the same on the contraction thereof, in order that the highest efficiency of compression without undue friction, will be the result.

However, it is to be understood that the specific type of ring described and illustrated constitutes the important feature of the invention per se and while I have specified a specific ring arrangement, it is to be understood that in actual practice, I find that it is sometimes advisable to place the rings in other ring grooves and in other positions relative to each other, in order to secure the best efficiency, in the different types of motors. For instance, in one type of motor, I have obtained perfect success by putting a plain ring in the first or top groove and a slotted ring with a joint as above mentioned, in the second groove, with the slotted section opening upward or toward the compression end of the cylinder, and a slotted ring with the same type of joint having the slotted section opening toward the crank end of the cylinder. However, it is to be understood that the arrangement may be altered as desired in practice.

In view of the foregoing, it is thought that the operation of the device will be readily understood, and in view of the simplicity and practical value thereof that it will readily commend itself to those skilled in the art.

It should be noted that the step-cut joints 17 are set on the outside and inside of the ring, making an inside and an outside lap instead of an edgewise lap, as in the ordinary step-cut, thus making a tight joint against pressure from the inside of the ring.

Having thus described my invention, what I claim is:—

1. The combination with a piston provided with a ring groove having imperforate walls; of a piston ring of the split expansion type comprising a concentric resilient ring body having a series of spaced recesses therein diagonally at one corner and adjacent the peripheral faces of the ring and piston for cooperation with the wall of the cylinder bore whereby to cause said ring to seat inwardly and outwardly under suction and compression respectively.

2. The combination with the cylinder of an internal combustion engine and a piston working therein, said piston being provided with a plurality of peripheral ring grooves adjacent the upper and lower ends thereof; of piston rings in said grooves and each comprising a concentric annular body having a lapped joint at the ends thereof, said body being provided with a series of slots cut from the inside to the outside and running to a thin edge at the outer circumference of the ring to form intermediate solid portions, said joint being formed at a solid portion and said rings being disposed to act in opposite directions and to seat inwardly and outwardly under suction and compression, respectively.

3. The combination with a piston having a pair of grooves at the compression end thereof and a single groove at the opposite end; of a plain step-cut piston ring in the second groove from the compression end and split rings in the other grooves, said rings having spaced diagonal grooves forming projecting edge portions and entrance slots between the walls of said grooves and the piston together with spaces between the walls of said grooves and the piston grooves, whereby to cause expansion and contraction of the rings under compression or suction.

4. The combination with a piston having a pair of grooves at the compression end thereof, and a single groove at the opposite end; of a plain step-cut piston ring in tne second groove from the compression end and split rings in the other grooves, said rings having spaced diagonal grooves forming projecting edge portions and entrance slots between the walls of said grooves and the piston together with spaces between the walls of said grooves and the piston grooves, whereby to cause expansion and contraction of the rings under compression or suction, said rings in the last named grooves being oppositely arranged with the projecting thin edges thereof disposed toward each other, substantially in the manner and for the purposes specified.

5. The combination with a piston having a plurality of grooves therein; of a plain stepped cut piston ring in one of said grooves and split rings in the other grooves, said rings having spaced diagonal grooves forming projecting edge portions and entrance slots between the walls of said grooves and the pistons with spaces between the walls of said grooves and piston grooves, whereby to cause expansion and contraction of the rings on depression of the piston.

6. As an article of manufacture, a piston ring comprising an imperforate expansible slipt ring body consisting of alternating integral longitudinal portions respectively substantially rectangular and substantially triangular in cross sectional contour, as and for the purpose set forth.

7. As an article of manufacture, a piston ring comprising an imperforate expansible split ring body consisting of alternating integral longitudinal portions respectively substantially rectangular and substantially triangular in cross sectional contour, the outer walls of said alternating portions being equal in length and lying throughout their length in arcs struck by radii of equal lengths.

JOHN HERBERT BRENNER.